Dec. 20, 1960  R. M. SPENCER  2,965,156
SEAT ADJUSTING MECHANISM
Filed Jan. 18, 1956  4 Sheets-Sheet 1

INVENTOR
Raymond M. Spencer
BY
Paul Fitzpatrick
ATTORNEY

Dec. 20, 1960   R. M. SPENCER   2,965,156
SEAT ADJUSTING MECHANISM
Filed Jan. 18, 1956   4 Sheets-Sheet 2
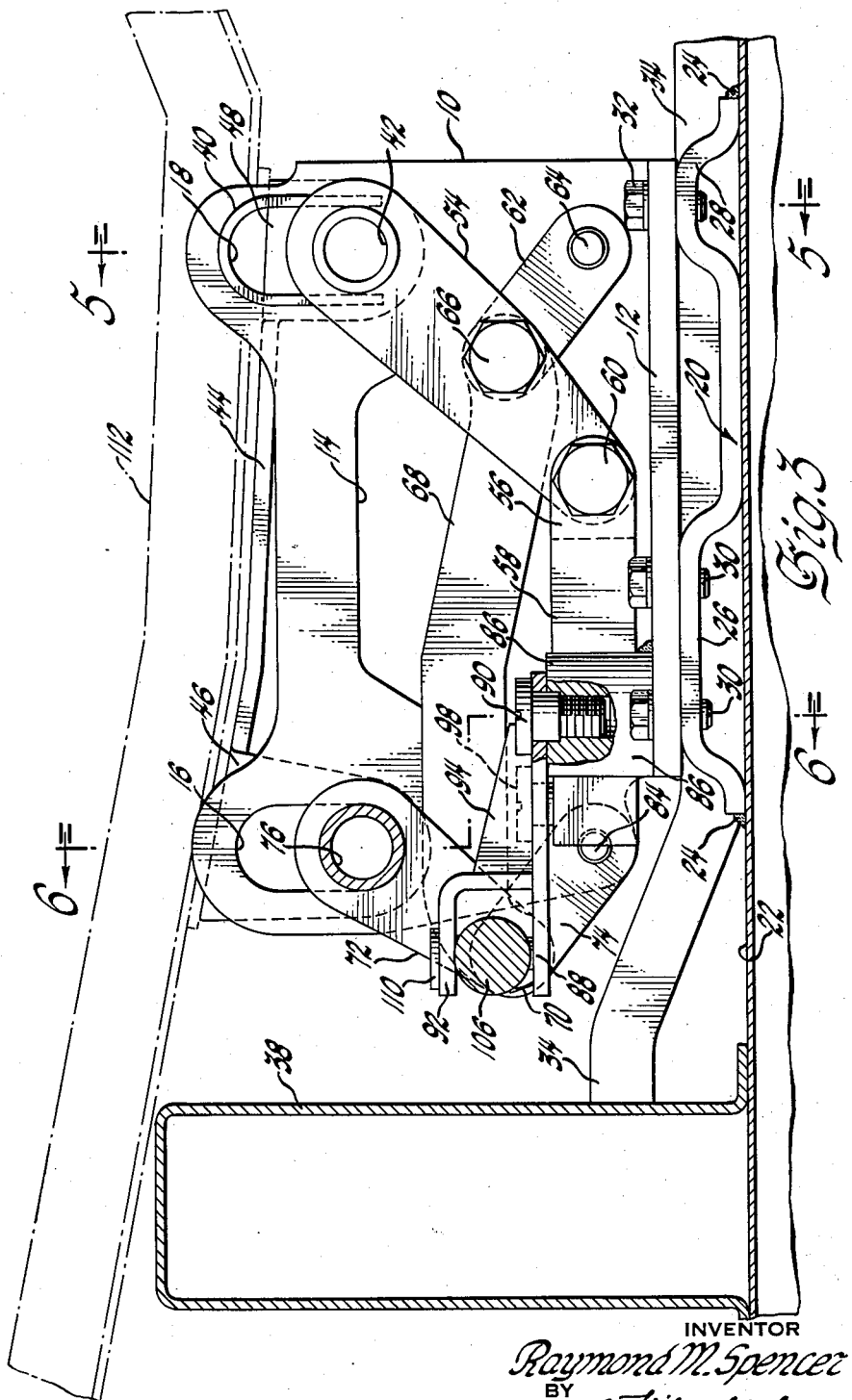
INVENTOR
Raymond M. Spencer
BY
Paul Fitzpatrick
ATTORNEY Dec. 20, 1960  R. M. SPENCER  2,965,156
SEAT ADJUSTING MECHANISM
Filed Jan. 18, 1956  4 Sheets-Sheet 3
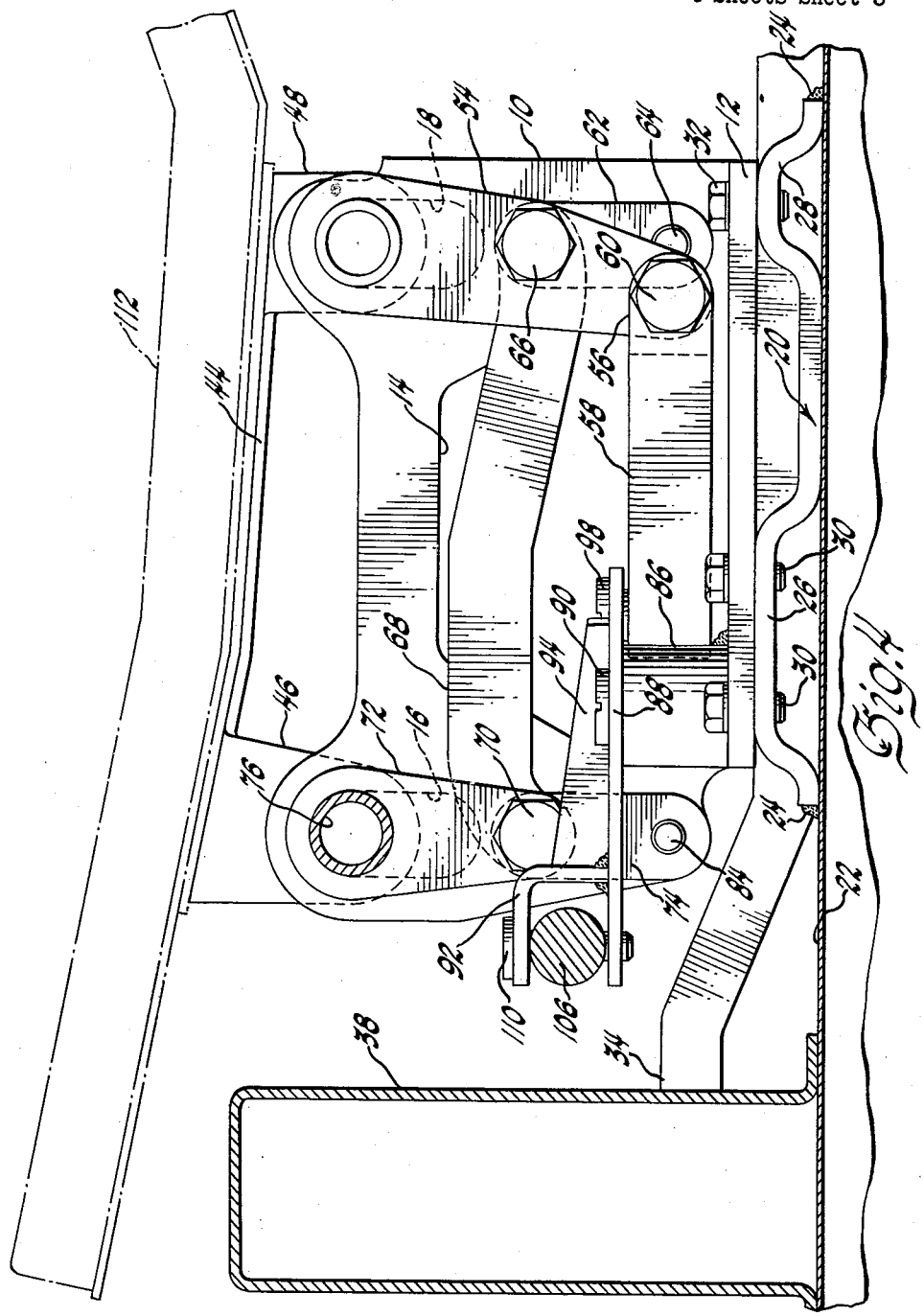
INVENTOR
Raymond M. Spencer
BY
Paul Fitzpatrick
ATTORNEY

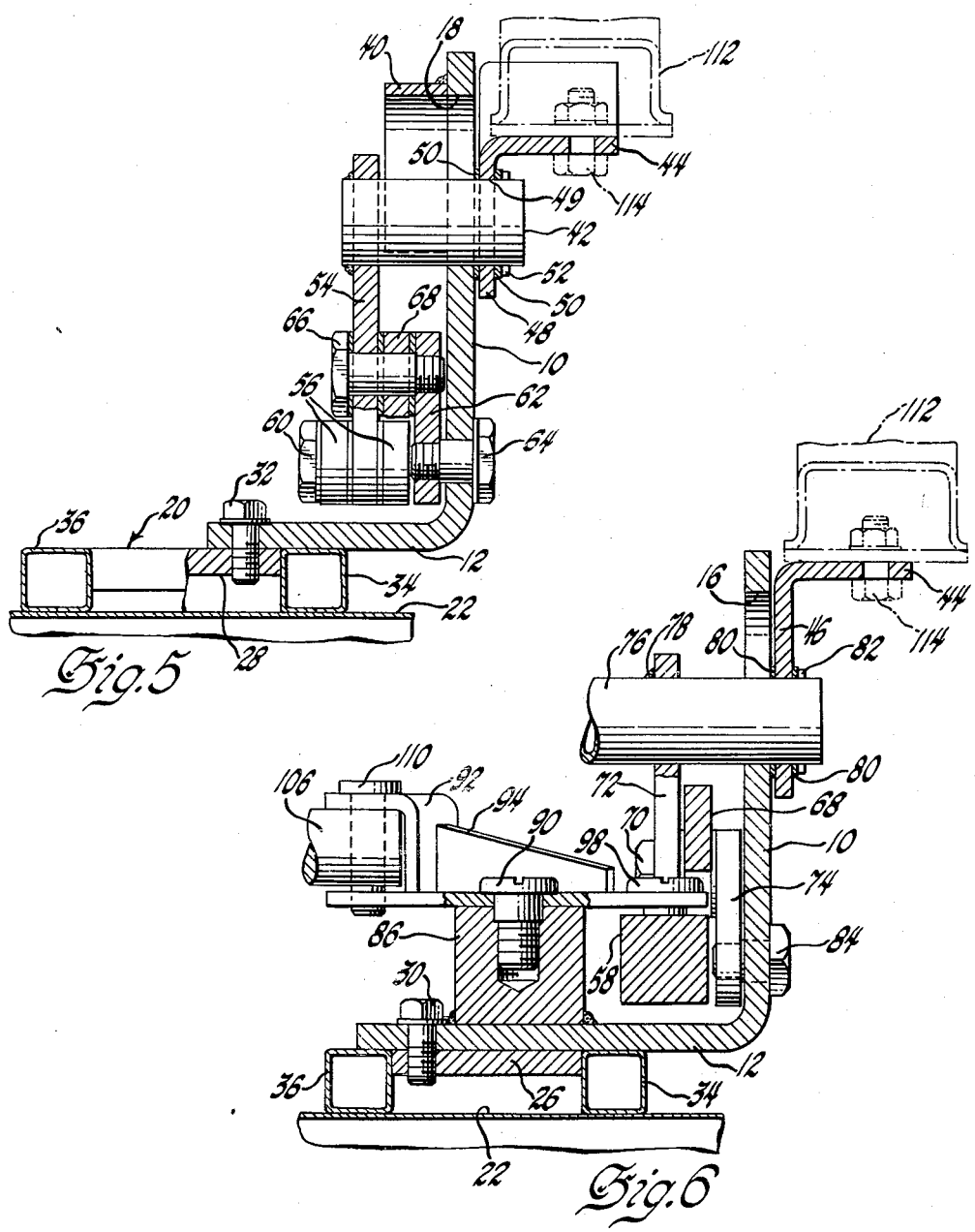

United States Patent Office 2,965,156
Patented Dec. 20, 1960

2,965,156

SEAT ADJUSTING MECHANISM

Raymond M. Spencer, 22334 O'Connor St.,
St. Clair Shores, Mich.

Filed Jan. 18, 1956, Ser. No. 565,759

6 Claims. (Cl. 155—91)

This invention relates to seat adjusting mechanisms and more particularly to a vehicle seat adjusting mechanism which will adjust the seat in vertical directions.

The seat adjusting mechanism of this invention is of the power operated type for vertical adjustment of vehicle front seats. In many prior power operated vehicle front seat adjusting mechanisms, the power actuator is disposed longitudinally of the seat in parallel relationship with the spaced seat adjusting mechanisms while the equalizer means is disposed transversely of the seat and operatively interconnects the spaced seat adjusting mechanisms. The power actuator and the equalizer means thus prevent utilization of the space underneath the seat as additional foot room for rear seat passengers and further constitute a safety hazard. If the seat is adjusted and a rear seat passenger happens to have his foot beneath the seat, it is possible for his foot to be injured, either by the seat, the equalizer means, or the power actuator.

The seat adjusting mechanism of this invention, in its preferred embodiment, includes both a power actuator and an equalizing means operatively interconnecting the spaced seat adjusting mechanisms. However, both the power actuator and the equalizing means are disposed transversely of the seat adjacent the front edge portion thereof so that substantially all of the space beneath the seat may be utilized as additional foot room for rear seat passengers. This arrangement is particularly useful to provide the necessary foot room for rear seat passengers in short wheel base vehicles. The seat adjusting mechanism of this invention also includes an improved manner of transferring the linear force of the actuator to the seat adjusting mechanism so as to raise and lower the seat in a smooth and continuous manner.

The primary object of this invention is to provide an improved vehicle seat adjusting mechanism for vertical adjustment of vehicle front seats. Another object of this invention is to provide a new and improved vehicle front seat adjusting mechanism which includes an equalizing means and a power actuator disposed in a manner so that substantially all of the space beneath the seat may be utilized as additional foot room for rear seat passengers. A more specific object of this invention is to provide an improved seat adjusting mechanism for a vehicle front seat which includes an equalizing means and a power actuator disposed transversely of the seat adjacent the front edge portion thereof.

These and other objects of this invention will be readily apparent from the following specification and drawings, wherein:

Figure 3 is an elevational view of a seat adjusting mechanism according to this invention taken on the plane indicated by line 3—3 of Figure 1 and showing the seat adjusting mechanism in the lowered position of the seat;

Figure 4 is a view similar to Figure 3 showing the seat adjusting mechanism in the raised position of the seat;

Figure 5 is a sectional view taken on the plane indicated by line 5—5 of Figure 3; and Figure 6 is a sectional view taken on the plane indicated by line 6—6 of Figure 3.

Figures 1, 2:
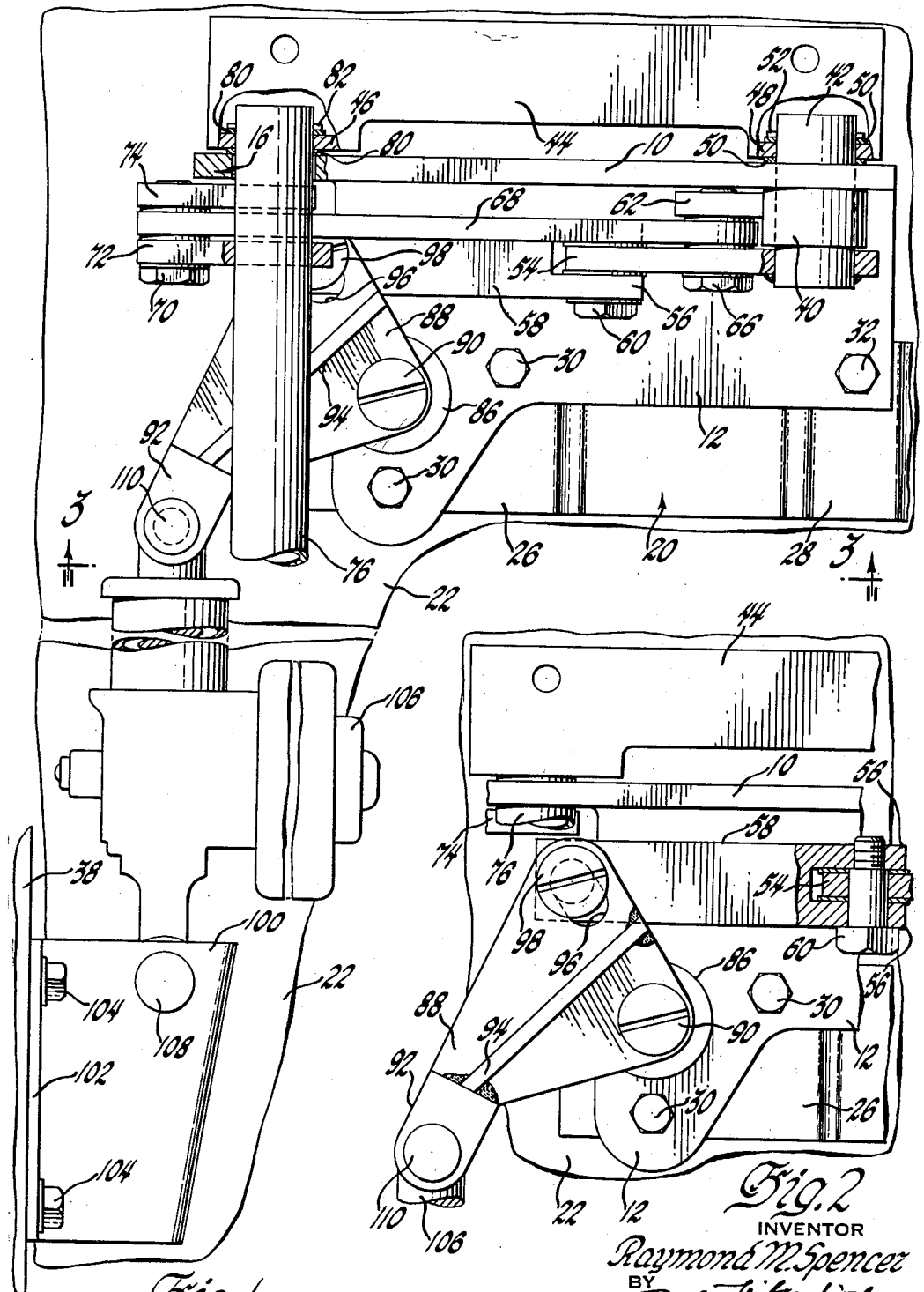
Figure 1 is a plan view of a seat adjusting mechanism according to this invention, with parts broken away for clarity of illustration.
Figure 2 is a view of a portion of Figure 1 with parts broken away for clarity of illustration.

Before proceeding with a description of the seat adjusting mechanism of this invention, it will be understood that the seat adjusting mechanism is the same on either side of the seat, with the spaced seat adjusting mechanisms being operatively interconnected by an equalizer means and being power actuated. Since the seat adjusting mechanism is the same on either side of the seat only one such mechanism is shown in the drawings and will be described. It will be understood that the other seat adjusting mechanism is of the same construction as the one described although of different hand.

Referring now to Figures 3, 5, and 6 an upright support plate 10 includes a laterally inwardly extending flange 12, a central aperture 14, and a pair of vertical slots 16 and 18 adjacent the forward and rearward edges, respectively, of the plate. A mounting plate 20 is welded to the vehicle floor pan 22 at 24 and includes a pair of spaced ribs 26 and 28 adjacent the forward and rearward edges, respectively, of the plate. Flange 12 of plate 10 is bolted to rib 26 at 30 and to rib 28 at 32 to rigidly secure the support plate 10 to the mounting plate 20 and to the vehicle body. As can be seen in Figures 5 and 6, an outboard box member 34 and an inboard box member 36 fit between the floor pan and the lower surface of flange 12 to further support plate 10 on the body, with both box members being welded to the outboard and inboard edges, respectively, of plate 20 and the floor pan 22. The inboard box member 36 is not shown in Figures 1 to 3 for clarity of illustration of other features. The forward end of each of the box members is welded or otherwise secured to a U-shaped floor pan rib 38 which spans the body transversely thereof and is welded to the floor pan 22.

Referring now particularly to Figures 3 and 5, a U-shaped guide plate 40 is secured to the inboard surface of plate 10 and extends partially around slot 18 in the plate. A stub shaft 42 is slidably mounted within slot 18 for vertical movement, with this movement being guided by plate 40. A seat support bracket 44 includes forward and rearward depending ears 46 and 48, respectively. Ear 48 is apertured at 49 and slidably mounted on the outboard portion of stub shaft 42. Resilient washers 50 are provided on either side of the ear, and a pin 52 on the stub shaft limits outward movement of the seat support bracket 44 relative to the shaft.

The upper end of a link 54 is apertured to receive the inboard end of shaft 42 and is welded to the shaft as shown in Figure 5. The lower end of link 54 is received within the spaced ears 56 of a shiftable bar 58 and is pivotally secured therein by means of a bolt 60 threaded in one of the ears. A link 62 is pivotally secured at one end thereof to plate 10 by a bolt 64 threaded in the link and the other end of the link is pivoted at 66 on link 54, with pivot 66 also pivotally securing one end of a shiftable link 68 to link 54.

Referring now particularly to Figures 1, 3, and 6, the other end of the shiftable link 68 is pivoted at 70 to a pair of links 72 and 74. The free end of link 72 is apertured to receive an equalizer rod 76, with the link being welded to the rod at 78 as shown in Figure 6. The equalizer rod spans the seat so as to operatively interconnect the spaced adjuster mechanisms, and the ends of the rod are slidably mounted within slots 16 of plate 10. The forward depending ear 46 of the seat support bracket 44 is apertured to receive the outboard end of the equalizer rod 76 and a pair of resilient washers 80 are provided on either side of the depending ear. A pin 82 on the equalizer rod limits outward movement of the seat support bracket relative to the rod. The free end of link 74 is pivoted on the support plate 10 at 84 as shown particularly in Figure 6.

An upwardly extending boss 86 is welded to flange 12 of support plate 10 adjacent the forward edge of the plate. A bell crank lever 88 is pivotally mounted on boss 86 by means of a shouldered bolt 90 threaded into the boss. An angle bracket 92 has one leg thereof welded to the bell crank to define a bifurcated portion therewith. A strengthening rib 94 has one edge welded to bracket 92 and another edge welded to the bell crank to strengthen the bifurcated portion. As can be seen particularly in Figure 2, the bell crank lever is slotted at 96 with this slot being slidably received by a shouldered bolt 98 threaded in the shiftable bar 58 adjacent the forward edge thereof. A U-shaped bracket 100 has its flanges 102 bolted to the rear wall of the rib 38 at 104. One end of a motor driven screw jack assembly 106 is received between the walls of bracket 100 and pivoted therein at 108. The other end of the screw jack assembly is received within the bifurcated portion of the bell crank lever and is pivoted therein at 110.

As shown schematically in Figures 3, 4, 5, and 6, the seat frame side box member 112 may be bolted to the seat support bracket 44 at 114 adjacent the forward and rearward edges of the bracket so as to mount one side of the seat frame on the seat adjusting mechanism. The seat frame side box members are joined by front and rear box members to provide a rigid seat frame which supports the usual vehicle seat.

The screw jack 106 is motor driven for extension and retraction movement transversely of the seat adjacent the front edge thereof. When the screw jack is extended, it swings the bell crank lever 88 clockwise about pivot 90 on boss 86 so as to shift bar 58 rearwardly of the seat. When the screw jack is retracted, it swings the bell crank lever 88 counterclockwise about pivot 90 on boss 86 so as to shift bar 58 forwardly of the seat. The lost motion connection provided by slot 96 in the bell crank prevents binding at the pivot 98 upon movement of the shiftable bar and the bell crank since the bell crank swings in an arc while bar 58 is linearly shiftable.

Link 62 and the portion of link 54 between pivot 66 and stub shaft 42 act as a rear toggle linkage. The free end of link 62 has a stationary pivotal axis at 64 and the free end of the portion of link 54 between pivot 66 and stub shaft 42 has a pivotal axis at the center of stub shaft 42, with this pivotal axis being guided for vertical movement by slot 18 and the stub shaft. The rear toggle linkage thus exerts a force along a vertical plane through the center of the stub shaft and through the center of pivot 64 as the toggle linkage is unfolded and folded to raise and lower the rear portion of the seat frame side member through bracket 44. Links 72 and 74 act as a front toggle linkage, with the free end of link 74 having a stationary pivotal axis at 84 and the free end of link 72 having a pivotal axis at the center of the equalizer rod 76, with this axis being guided for vertical movement by the equalizer rod and slot 16. The front toggle linkage thus exerts a force along a vertical plane through the center of the equalizer rod and the center of pivot 84 as the toggle linkage is unfolded and folded to raise and lower the forward portion of the seat frame side member through bracket 44. The front and rear toggle linkages are coordinated in their movement by the shiftable link 68, and the spaced seat adjusting mechanisms are coordinated in their movement by the equalizer rod 76.

Referring now particularly to Figures 3 and 4, the operation of the seat adjusting mechanism will be described.

Figure 3 shows the seat adjusting mechanism in its lower vertical position and Figure 4 shows the seat adjusting mechanism in its upper vertical position. Assuming now that the seat adjusting mechanism is in its position shown in Figure 3 and it is desired to move the adjusting mechanism to its position shown in Figure 4 or to any intermediate position to raise the seat frame and the seat. The motor driven screw jack 106 is extended to swing bell crank 88 clockwise about pivot 90 and shift bar 58 rearwardly of the seat. As bar 58 shifts rearwardly of the seat, it will move link 54 rearwardly and upwardly as the rear toggle linkage unfolds and moves stub shaft 42 upwardly within slot 18. Upward movement of stub shaft 42 within slot 18 will raise the rear portion of bracket 44. The rearward and upward movement of link 54 will also shift link 68 rearwardly of the seat to unfold the front toggle linkage and move the equalizer rod 76 upwardly within slot 16. Upward movement of the equalizer rod raises the front portion of bracket 44. Thus, both the front and rear toggle linkages are simultaneously unfolded to raise the seat support bracket 44.

As can be seen particularly in Figure 4 of the drawings, when the seat is in its fully raised position, the center lines of pivots 70 and 84 are substantially in alignment with the center line of the equalizer rod 76, and the center lines of pivots 64 and 66 are substantially in alignment with the center line of stub shaft 42. By thus having the forward and rearward horizontal pivots of the seat 70, 84, and 66, 64, respectively, in substantially aligned relationship with the equalizer rod and the stub shaft in the raised position of the seat, a substantial part of the occupant load on the seat is applied along the center line of the forward links 72 and 74 and along the center line of the rear link 62 and the center line of the upper portion of link 54.

If it is desired to move the seat adjusting mechanism from its upper vertical position as shown in Figure 4 to its lower vertical position as shown in Figure 3, or to any intermediate position therebetween, the motor driven screw jack 106 is retracted to swing bell crank lever 88 counterclockwise about pivot 90 and shift bar 58 forwardly of the seat. This will shift link 54 forwardly and downwardly and fold the rear toggle linkage as stub shaft 42 is moved downwardly within slot 18 to lower the rear portion of bracket 44. The forward and downward shifting movement of link 54 also shifts link 68 forwardly of the seat to fold the front toggle linkage. As the front toggle linkage folds, the equalizer rod 76 is moved downwardly within slot 16 to lower the front portion of bracket 44. Thus, both the front and rear toggle linkages are simultaneously folded to lower the seat support bracket 44.

Each of the spaced seat adjusting mechanisms has its own power actuator, with both power actuators being simultaneously operable to either raise or lower the seat supporting brackets in unison. The equalizer rod interconnects the spaced seat adjusting mechanisms and is rigidly secured to each link 72 to ensure that both sides of the seat move together and to also aid in reducing seat side sway to a minimum.

It will be noted that both the power actuator 106 and the equalizer rod 76 are positioned adjacent the front edge portion of the spaced seat adjusting mechanism. Upon reference to Figures 1 and 3, it will be noted that in the lower vertical position of the seat adjusting mechanism, substantially all of the space beneath the seat and between the spaced seat adjusting mechanisms is available as additional foot room for a rear seat passenger. Likewise, the same is true when the seat is in its upper vertical position as shown in Figure 4. It will also be noted that it is substantially impossible for the foot of a rear seat passenger to be injured if he happens to place his foot underneath the seat. The equalizer rod 76 slides vertically and is secured to the seat support bracket which supports the seat so that the space between the rod and the lower portion of the seat remains constant and the space between the rod and the floor pan varies but is always large enough to prevent injury to the foot of a passenger between the rod and the floor pan. Similarly, since the motor driven screw jack 106 exerts a linear force transversely of the seat, it is impossible for the actuator to injure the foot of a passenger which is either between the actuator and the floor pan or between the actuator and the seat.

Thus, this invention provides a vehicle seat adjusting mechanism which will adjust a vehicle front seat in vertical directions and will also provide additional foot room for rear seat passengers by utilizing substantially all of the space beneath the front seat. By locating both the power actuator and the equalizer rod adjacent the front edge portion of the seat, there are no obstacles against a rear seat passenger placing his foot underneath the front seat and further there are no safety hazards since it is impossible for his foot to be injured upon vertical adjustment of the front seat.

I claim:

1. A vehicle seat adjusting mechanism comprising, a support, a first foldable toggle linkage having one link thereof pivotally secured to said support and the other link thereof operatively secured to a vehicle seat, a lever operatively secured adjacent one end thereof to said seat, a second foldable toggle linkage having one link thereof pivotally secured to the joint of said first toggle linkage and the other link thereof pivotally secured to said support, means pivotally connecting the joint of said second toggle linkage to an intermediate portion of said lever, an operating member operatively secured to said lever adjacent the other end thereof, power actuating means exerting a force in a plane transversely of the plane of movement of said second toggle linkage, and a lever swingable in a plane transverse of the plane of movement of said second toggle linkage and being operatively connected to said operating member and to said power actuating means for transferring power from said power actuating means to said operating member.

2. A vehicle seat adjusting mechanism comprising, a support, extensible and retractable operated means mounted on said support for movement in a vertical plane between extended and retracted positions, extensible and retractable power operating means exerting a force in a transverse vertical plane normal to the plane of movement of said extensible and retractable operated means, and means movable in a transverse horizontal plane normal to the plane of movement of said extensible and retractable operated means and operatively connecting said power operating means with said extensible and retractable operated means for movement of said operated means to said extended and retracted positions.

3. A vehicle seat adjusting mechanism comprising, a support, guide means on said support, foldable linkage means having the free end of one link thereof pivotally mounted on said support and the free end of the other link thereof guided for movement by said guide means whereby said linkage means is movable in a vertical plane between folded and unfolded positions, power operating means exerting a force in a transverse vertical plane normal to the plane of movement of said linkage means, and means movable in a transverse horizontal plane normal to the plane of movement of said linkage means and operatively interconnecting said power operating means with said linkage means for moving said linkage means between folded and unfolded positions.

4. A vehicle seat adjusting mechanism comprising, a support, spaced foldable linkage means pivotally mounted on said support and movable in a vertical plane between folded and unfolded positions, power operating means exerting a force in a transverse vertical plane normal to the plane of movement of said linkage means, means movable in a transverse horizontal plane normal to the plane of movement of said linkage means and operatively interconnecting said power operating means with one of said linkage means for moving said one linkage means between said folded and unfolded positions, and means operatively interconnecting said one linkage means with said other linkage means for coordinating folding and unfolding movement of said other linkage means with respective movement of said one linkage means.

5. A vehicle seat adjusting mechanism comprising, a support, a first foldable toggle linkage having one link thereof pivotally secured to said support and the other link thereof operatively secured to a vehicle seat, a lever operatively secured adjacent one end thereof to said seat, a second foldable toggle linkage having one link thereof pivotally secured to the joint of said first foldable toggle linkage and having the other link thereof pivotally secured to said support, means pivotally securing the joint of said second toggle linkage to said lever intermediate the ends thereof, a shiftable member operatively secured to said lever adjacent the other end thereof, a swingable lever mounted on said support and secured to said shiftable member, and actuating means operatively secured to said swingable lever.

6. A vehicle seat adjusting mechanism comprising, a support, a first toggle linkage having one link thereof pivotally secured to said support and the other link thereof operatively secured to a vehicle seat, a lever operatively secured adjacent one end thereof to said seat, a second toggle linkage having one link thereof pivotally secured to the joint of said first toggle linkage and the other link thereof pivotally secured to said support, means pivotally connecting the joint of said second toggle linkage to an intermediate portion of said lever, a shiftable member operatively secured to said lever adjacent the other end thereof, power actuating means exerting a force in a transverse plane normal to the plane of movement of said second toggle linkage and said lever, and a bell crank lever pivotally mounted on said support for movement in a transverse horizontal plane normal to the plane of movement of said first toggle linkage and operatively interconnecting said power actuating means and said shiftable member.

References Cited in the file of this patent

UNITED STATES PATENTS

| | | |
|---|---|---|
| 1,171,297 | Adams | Feb. 8, 1916 |
| 1,429,945 | Hern | Sept. 26, 1922 |
| 1,590,090 | Herz | June 22, 1926 |
| 1,725,216 | Seldomridge | Aug. 20, 1929 |
| 1,799,229 | Hanna | Apr. 7, 1931 |
| 1,807,960 | Brownell | June 2, 1931 |
| 2,206,788 | Meacham | July 2, 1940 |
| 2,260,032 | Kaiser et al. | Oct. 21, 1941 |
| 2,354,710 | Simpson et al. | Aug. 1, 1944 |
| 2,641,305 | Oishei | June 9, 1953 |
| 2,784,764 | Rigby et al. | Oct. 11, 1955 |
| 2,809,005 | Goode | Oct. 8, 1957 |
| 2,809,688 | Brundage | Oct. 15, 1957 |

UNITED STATES PATENT OFFICE
CERTIFICATION OF CORRECTION

Patent No. 2,965,156                        December 20, 1960

Raymond M. Spencer

It is hereby certified that error appears in the above numbered patent requiring correction and that the said Letters Patent should read as corrected below.

In the grant, lines 1, 2 and 3, for "Raymond M. Spencer, of St. Clair Shores, Michigan," read -- Raymond M. Spencer, of St. Clair Shores, Michigan, assignor to General Motors Corporation of Detroit, Michigan, a corporation of Delaware, --; line 12, for "Raymond M. Spencer, his heirs" read -- General Motors Corporation its successors --; in the heading to the printed specification, lines 3 and 4, for "Raymond M. Spencer, 22334 O'Connor St., St. Clair Shores, Mich." read -- Raymond M. Spencer, St. Clair Shores, Mich., assignor to General Motors Corporation, Detroit, Mich., a corporation of Delaware --.

Signed and sealed this 23rd day of May 1961.

(SEAL)
Attest:

ERNEST W. SWIDER
Attesting Officer

DAVID L. LADD
Commissioner of Patents